United States Patent
Chud et al.

(10) Patent No.: US 9,307,026 B2
(45) Date of Patent: Apr. 5, 2016

(54) FULFILLMENT OF APPLICATIONS TO DEVICES

(71) Applicant: Amazon Technologies, Inc., Reno, NV (US)

(72) Inventors: Andrew C. Chud, Seattle, WA (US); Josiah P. Olivieri, Redmond, WA (US); Thomas M. Mathiesen, Seattle, WA (US); Laura A. Blanchard, Seattle, WA (US); Andrei V. Vilkotski, Sammamish, WA (US); Ata U. Bhatti, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 391 days.

(21) Appl. No.: 13/623,143

(22) Filed: Sep. 20, 2012

(65) Prior Publication Data

US 2014/0082050 A1    Mar. 20, 2014

(51) Int. Cl.
    *G06F 15/16*   (2006.01)
    *H04L 29/08*   (2006.01)
    *G06F 9/445*   (2006.01)

(52) U.S. Cl.
    CPC ............ *H04L 67/12* (2013.01); *G06F 9/44536* (2013.01); *H04L 67/10* (2013.01); *H04L 67/34* (2013.01)

(58) Field of Classification Search
    CPC .......... H04L 67/10; H04L 67/12; H04L 67/34
    USPC .......... 709/201, 202, 203, 219, 226; 717/168, 717/169, 170
    See application file for complete search history.

(56) References Cited

U.S. PATENT DOCUMENTS

| | | | |
|---|---|---|---|
| 2006/0277535 | A1 | 12/2006 | Ketzer |
| 2008/0301231 | A1* | 12/2008 | Mehta et al. .................. 709/204 |
| 2009/0119678 | A1* | 5/2009 | Shih et al. ..................... 719/313 |
| 2010/0325167 | A1 | 12/2010 | Landry |
| 2011/0093773 | A1 | 4/2011 | Yee |
| 2011/0231280 | A1 | 9/2011 | Farah |
| 2012/0089906 | A1 | 4/2012 | Reeves et al. |
| 2012/0203862 | A1* | 8/2012 | Tayeb et al. ................... 709/217 |
| 2013/0104113 | A1* | 4/2013 | Gupta et al. .................. 717/169 |
| 2013/0232229 | A1* | 9/2013 | Firman et al. ................. 709/219 |

OTHER PUBLICATIONS

International Search Report mailed Apr. 8, 2014.

* cited by examiner

*Primary Examiner* — Cheikh Ndiaye
(74) *Attorney, Agent, or Firm* — Thomas | Horstemeyer, LLP

(57) ABSTRACT

Disclosed are various embodiments for facilitating fulfillment of applications to various devices that may be associated with a user account. When a request to obtain access to an application is received, a device characteristic of the various devices is identified and a corresponding application binary associated with the application is identified. The corresponding application binaries are distributed to the devices corresponding to the user account. Additionally, an appropriate browser accessible application is identified and access can be granted to a device depending upon the capabilities of a browser executed by the device.

22 Claims, 8 Drawing Sheets

FULFILLMENT OF APPLICATIONS TO DEVICES

BACKGROUND

Users may purchase applications, such as mobile applications or other types of software products, in an electronic marketplace. An application that is purchased is often incompatible with other devices that may, for example, execute varying operating systems or have varying device capabilities. Accordingly, a user may be forced to locate a compatible version of an application for the various devices that the user may own.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Embodiments of the present disclosure are related to fulfillment of applications to multiple client devices and potentially in multiple formats. A user in a marketplace that facilitates the purchase, rental, and/or distribution of applications can obtain access to an application, such as a game, utility, or any other type of application that can be executed on a client device. An application can be created and delivered in many forms, such as various binary forms that are compatible with various client device operating systems. An application binary can also be tailored to a specific device type or take advantage of specific hardware capabilities or features of a particular client device. For example, two client devices may execute the same operating system but may be configured with displays of varying resolution. Accordingly, application binaries can be created corresponding to an application that are each tailored to the varying display resolution of each client device.

Additionally, a user can purchase an application and various embodiments of the present disclosure can facilitate fulfillment of application binaries in various formats for use on various devices that are associated with the user account. For example, a user may own and use a tablet device as well as a smartphone and associate both devices with a user account. The user may purchase or otherwise obtain access to an application via an electronic commerce system. Accordingly, embodiments of the present disclosure can facilitate fulfillment of the application to the various devices associated with the user account. Additionally, embodiments of the disclosure can also grant user access to a network accessible version of the application (e.g., a web or browser based version of an application) to the user, if such a version exists.

Figure 1:
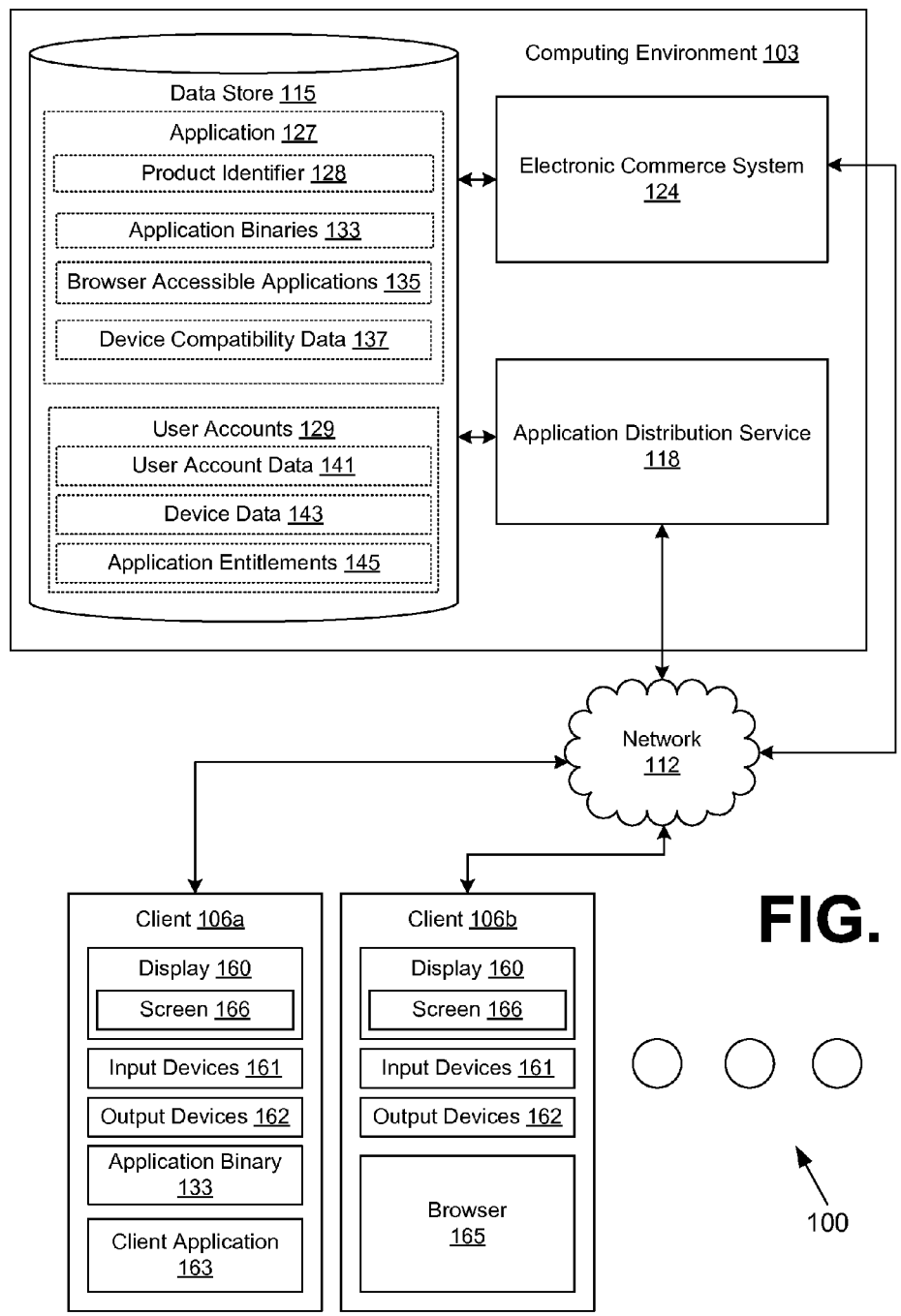
FIG. 1 is a drawing of a networked environment according to various embodiments of the present disclosure.

With reference to FIG. 1, shown is a networked environment 100 according to various embodiments. The networked environment 100 includes a computing environment 103 and at least one client device 106, which are in data communication with each other via a network 112. The network 112 may include, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 115 that is accessible to the computing environment 103. The data store 115 may be representative of a plurality of data stores 115 as can be appreciated. The data stored in the data store 115 for example, is associated with the operation of the various applications and/or functional entities described below.

The components executed on the computing environment 103, for example, include an application distribution service 118, an electronic commerce system 124, and other applications, services, processes, systems, engines, or functionality not discussed in detail herein. The application distribution service 118 is configured to distribute compatible versions of applications to client devices 106 for download. The application distribution service 118 can also grant access to a particular user account and/or client 106 to browser accessible content, such as a web application. For example, the application distribution service 118 may offer applications for sale through an application marketplace, including multiple applications from multiple developers.

The electronic commerce system 124 is executed in order to facilitate the online purchase of items such as applications over the network 112. The electronic commerce system 124 also performs various backend functions associated with the online presence of a merchant in order to facilitate the online purchase of items. For example, the electronic commerce system 124 may generate network pages or portions thereof that are provided to clients 106 for the purposes of selecting items for purchase, rental, download, lease, or other forms of consumption.

The data stored in the data store 115 includes, for example, applications 127, user accounts 129, and potentially other data. The applications 127 may correspond, for example, to games or other types of applications. As non-limiting examples, the application 127 may correspond to a high twitch-action game, a first-person shooter game, an action game, an adventure game, a party game, a role-playing game, a simulation game, a strategy game, a vehicle simulation game, and/or other types of games.

The applications 127 may also correspond to mobile phone applications, computer-aided design (CAD) applications, computer-aided manufacturing (CAM) applications, photo manipulation applications, video editing applications, office productivity applications, operating systems and associated applications, emulators for operating systems, architectures, and capabilities not present on a consumer device, and other applications and combinations of applications. The application 127 may be configured for execution in a general-purpose computing device or in a specialized device such as, for example, a smartphone, a video game console, a handheld game device, an arcade game device, etc. In various embodiments, the applications 127 may include support for multiple operating systems, code libraries, client computing devices, etc. which may be unnecessary depending on the client 106 on which the applications 127 are executed.

Each of the applications 127 is associated with at least one product identifier 131 with which the application 127 can be uniquely identified with respect to other applications 127 available via the application distribution service 118. Additionally, the application 127 can be associated with various application binaries 133 that represent different versions of the application that are compatible with various device types. For example, a first application binary 133 associated with an application 127 can be compatible with a first operating system while a second application binary 133 can be compatible with a second operating system. In some embodiments, each of the application binaries 133 can be associated with its own product identifier 131 or other type of unique identifier.

Additionally, an application 127 can also be associated with application binaries 133 that may be tailored to particular device capabilities and/or hardware features of a particular client 106 on which the application binary 133 will be executed. For example, a first application binary 133 can be tailored to a particular operating system and screen resolution, while a second application binary 133 may be executable within the same operating system but tailored to a different screen resolution. Application binaries 133 can also be tailored to other hardware or software device capabilities and configurations, such as the presence or configuration of camera devices, microphones, input devices such as keyboards, buttons, touchscreen input devices, and device capabilities as can be appreciated. In other words, application binaries 133 can be associated with various device types and/or device features so that a version of the application 127 that is tailored to a particular client 106 associated with a particular user can be created and provided to the user.

Some applications 127 may also be associated with a browser accessible application 135, such as a web application or browser based version of the application 127. Browser accessible applications 135 associated with an application 127 can also be tailored to specific device capabilities and/or configurations. For example, a browser accessible application 135 can be tailored to a specific browser and/or hardware capability of a client 106 with which a user accesses the browser accessible application 135 that is available via a browser executed on the client 106. As one scenario, a first browser accessible application 135 associated with an application 127 can be tailored to a specific display resolution of the client 106. A second browser accessible application 135 can in turn be tailored to another display resolution of the client 106. As another example, a first browser accessible application 135 can be tailored to whether the browser reports a location of the user to the application distribution service 118, and/or whether hardware capabilities of the client 106 are otherwise accessible via a browser executed by the client 106. Additionally, localized and/or language specific versions of the application binaries 133 and browser accessible applications 136 can also be maintained and delivered to a client 106.

The device compatibility data 137 can specify which application binaries 133 and/or which browser accessible applications 135 are appropriate for a particular device configuration that the user may register with the application distribution service 118 or on which a user may request for an application 127 to be fulfilled. For example, the device compatibility data 137 can associate a particular feature or configuration of a client 106 with one or more application binaries 133 and/or browser accessible applications 135. In other words, the device compatibility data 137 can identify which application binaries 133 or browser accessible application 135 associated with an application 127 are appropriate for a particular aspect of a client 106, whether such an aspect is the operating system executed by the client 106 or any other device capability or feature.

For example, the device compatibility data 137 can identify one or more hardware features associated with a device and identify an application binary and/or browser accessible application 135 that is appropriate for one of the device features or any combination thereof. Such a device feature or characteristic can include a camera characteristic, a display resolution, a microphone characteristic, a processor speed, a processor identity, a number of processors or processor cores present in device, a speaker characteristic, and/or a presence of a global navigation satellite system chipset. As another example, the device compatibility data 137 can identify an application binary 133 and/or browser accessible application 135 that are associated with a particular device model number, brand, or other information from which a client 106 can be identified.

Accordingly, the application distribution service 118 can obtain various application binaries 133 as well as browser accessible application 135 that correspond to an application 127 from a developer and/or application provider along with device compatibility data 137 that specifies with which devices, device capabilities, and/or device features that each of the application binaries 133 and/or browser accessible applications 135 are compatible.

The user accounts 129 correspond to information about users of the application distribution service 118. User account data 141 can include, for example, personal information associated with the user such as authentication credentials, shipping addresses, payment information, and other user information as can be appreciated. Each user account can also be associated with device data 143 that identifies the various devices that a user has registered with the application distribution service 118. Via the application distribution service 118, a user may register multiple clients 106 with the user account on which the user is authorized to access application binaries 133 and/or browser accessible application 135 corresponding to an application 127 to which the user is entitled to access. For example, a user may purchase an application 127 via the electronic commerce system 124, and the application distribution service 118 can facilitate fulfillment of compatible versions of application binaries 133 to the various clients 106 that the user has registered with the application distribution service 118 and that are identified in the device data 143.

To facilitate such functionality, the device data 143 can include a unique identifier associated with each of the user's registered clients 106 that is unique with respect to other clients 106 associated with the user as well as other users of the application distribution service 118. Additionally, the device data 143 can include information about the capabilities of the clients 106 that a user has registered so that compatible versions of application binaries 133 and/or browser accessible applications 135 can be fulfilled to the user's clients 106 by the application distributions service 118.

Application entitlements 145 identify one or more applications 127 that a user is authorized to access. For example, the application entitlements 145 can identify application 127 that a user has purchased via the electronic commerce system 124 or otherwise become entitled to access and/or download to a client 106 that is associated with the user account of the user. Accordingly, the application distribution service 118 can facilitate fulfillment of one or more of the applications 127 identified by the application entitlements 145 to the various clients 106 associated with the user's account.

The client 106 is representative of a plurality of client devices that may be coupled to the network 112. The client 106 may comprise, for example, a processor-based system such as a computer system. Such a computer system may be embodied in the form of a desktop computer, a laptop computer, personal digital assistants, cellular telephones, smartphones, music players, web pads, tablet computer systems, set-top boxes, game consoles, televisions, electronic book readers, or other devices with like capability. The client 106 may include a display 160. The display 160 may comprise, for example, one or more devices such as cathode ray tubes (CRTs), liquid crystal display (LCD) screens, gas plasma-based flat panel displays, LCD projectors, touchscreens, or other types of display devices, etc. The client 106 may include other input devices 161 and output devices 162. The input devices 161 may comprise, for example, devices such as keyboards, mice, joysticks, accelerometers, cameras, microphones, light guns, game controllers, touch pads, touch sticks, push buttons, optical sensors, microphones, webcams, touch screen input devices, and/or any other devices that can provide user input. The output devices 162 may correspond to light indicators, haptic devices, force feedback devices, vibration devices, sound devices, and/or other devices.

The client 106a, 106b may be configured to execute various applications such as a client application 163, as well as an application binary 133 obtained from the application distribution service 118. The client application 163 may correspond, for example, to a browser or mobile application that accesses and renders content served up by the computing environment 103 and/or other servers, thereby generating a screen 166 on the display 160. The client application 163, in one embodiment, can represent an application or service executed by the client 106a to access, browse, and/or purchase applications 127 via the electronic commerce system 124.

In one embodiment, the client application 163 can comprise a special purpose application in which a user can browse applications 127 available for purchase and download via the application distribution service 118. The client application 163 can provide a user interface that allows the user to purchase an application 127, after which the application distribution service 118 can facilitate fulfillment of the appropriate compatible version of an application binary 133 to the client 106. For example, the client application 163 can transmit a user's authentication credentials to the application distribution service 118, which can identify which applications 127 the user is entitled to access. The client application 163 can then obtain application binaries 133 corresponding to the applications to which the user is entitled to access. Additionally, the client application 163 can also discover device capabilities corresponding to a client 106 on which the client application 163 is executed and register the device with the application distribution service 118. Accordingly, the application distribution service 118 can identify the appropriate compatible versions of the application binaries 133 and/or browser accessible applications 135 of the applications 127 that the user is entitled to access.

As another example, a client 106b may also execute a browser 165 through which a browser accessible application 135 corresponding to an application 127 that a user and/or client 106 associated with a user account is authorized to access. In such a scenario, the client 106b may be authenticated by the application distribution service 118 by a username/password pair or other authentication credentials of a user. The client 106b may also be authenticated via a browser cookie, MAC address, or any other device identifier that can be obtained via the browser 165 and through which the application distribution service 118 can identify a user account associated with the client 106b. It should be appreciated that a user may register multiple clients 106 of varying capabilities with a user account, and that the depicted example is illustrated merely to show how various clients 106 of varying capability can be used in conjunction with the application distribution service 118.

Next, a general description of the operation of the various components of the networked environment 100 is provided. To begin, as noted above, a user can purchase and/or request access to applications 127 via the electronic commerce system 124 and/or application distribution service 118. Upon processing payment information associated with the purchase and/or determining whether the user is authorized to access the application 127, the application distribution service 118 can initiate fulfillment of an application binary 133 associated with the application 127 that is compatible with a client 106 of the user.

In one embodiment, the user may execute a client application 163 on a client 106a for the purpose of interacting with the application distribution service 118. The client application 163 can discover the capabilities of a client 106a, such as its hardware and/or software capabilities and features, and communicate information about the client 106a to the application distribution service 118. The application distribution service 118 can also facilitate registration of the client 106a with a user account 129 of the user. In response to receiving information about a particular client 106a from the client application 163, the application distribution service 118 can associate the device with the user account 129 of the user. Additionally, the application distribution service 118 can also determine the appropriate application binary 133 and/or browser accessible application 135 that are compatible with the client 106a based upon the received information about the client 106a.

Accordingly, the application distribution service 118 can then initiate fulfillment of the appropriate compatible version of the application to the client 106*a*. In one embodiment, the device compatibility data 137 identifies appropriate application binaries 133 for a particular client 106*a* associated with a user account 129 by consulting the device compatibility data 137 of an application 127. The device compatibility data 137 identifies a compatible version of an application binary 133 for a particular device based upon the hardware and/or software capabilities of the client 106*a* that are reported by the client application 163 to the application distribution service 118.

The application distribution service 118 can transmit the compatible application binary 133 to the client application 163, which can install the application binary 133 on the client 106*a*. The application distribution service 118 can also initiate fulfillment of application binaries 133 to other devices associated with the user account 129 based upon the device compatibility data 137 and the registered devices of the user as identified by the device data 143 corresponding to the user account 129. In this way, a user can purchase or obtain access to an application 127, and the application distribution service 118 can facilitate fulfillment of compatible versions of application binaries 133 to the various devices associated with the user's account.

Additionally, the application distribution service 118 can also grant access to the browser compatible applications 135 associated with the application 127 so that the user can access a version of the application 127 even when doing so from a device that is not associated with the device data 143 of the user's account. In one embodiment, the user can access a site via a browser 165 executed by the client 106*b*, where such a site is facilitated by the application distribution service 118 and/or electronic commerce system 124 and provides access to applications 127 to which the user is entitled to access according to the application entitlements 145. The site can request to discover the capabilities of the client 106*b* via the browser 165 such as its hardware and/or software capabilities and features. The browser 165 can communicate information about the client 106*b* to the application distribution service 118.

For example, the browser 165 can communicate a display resolution, location detection capabilities, available input devices, a browser version, operating system, and other capabilities and features of the client 106*b* as can be appreciated. In response to receiving information about a particular client 106*b* from the client application 163, the application distribution service 118 can identify a browser accessible application 135 that is compatible with the client 106*b* based upon the received information about the browser 165. The application distribution service 118 can then forward a request to access an application 127 on behalf of a user to an appropriate compatible version of the browser accessible application 135.

Figure 2:
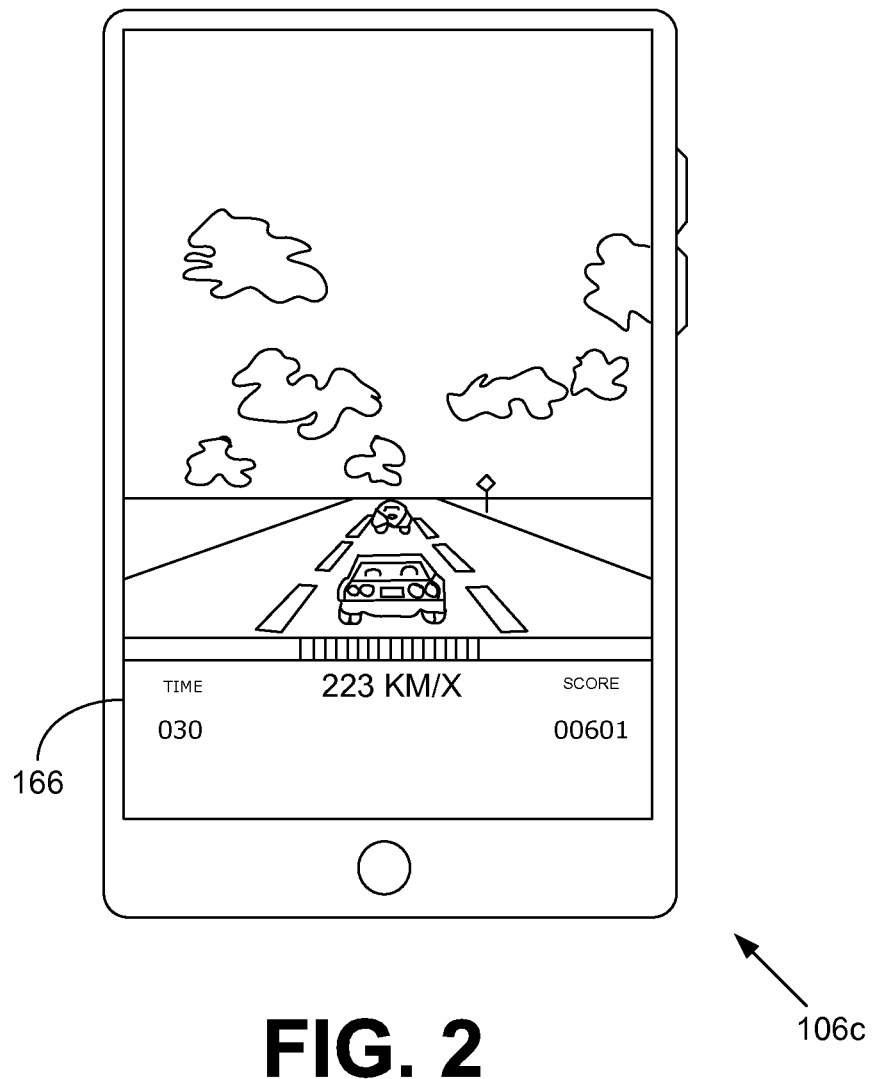
FIG. 2 is a drawing of an example of a user interface rendered by a device in the networked environment of FIG. 1 according to various embodiments of the present disclosure.

Turning now to FIG. 2, shown is one example of a client 106 in the networked environment 100 (FIG. 1). In this non-limiting example, the client 106*c* corresponds to a smartphone. The screen 166 of the client 106*c* shows a user interface generated by an application binary 133 (FIG. 1) executed by the device. In the depicted example, the application binary 133 executed by the client 106*c* is selected by the application distribution service 118 depending upon the capabilities and features of the client 106 as reported by a client application 163 and/or browser 165 from which the a user accesses the application distribution service 118 or any site in communication with the application distribution service 118.

In the depicted example, the application binary 133 executed by the client 106 can be tailored to the device resolution, aspect ratio, and/or size of the display 160. The application binary 133 can also be tailored to the operating system executed by the client 106 as well as the type of user input device, such as a capacitive touchscreen input device, with which the device is equipped.

Figure 3:
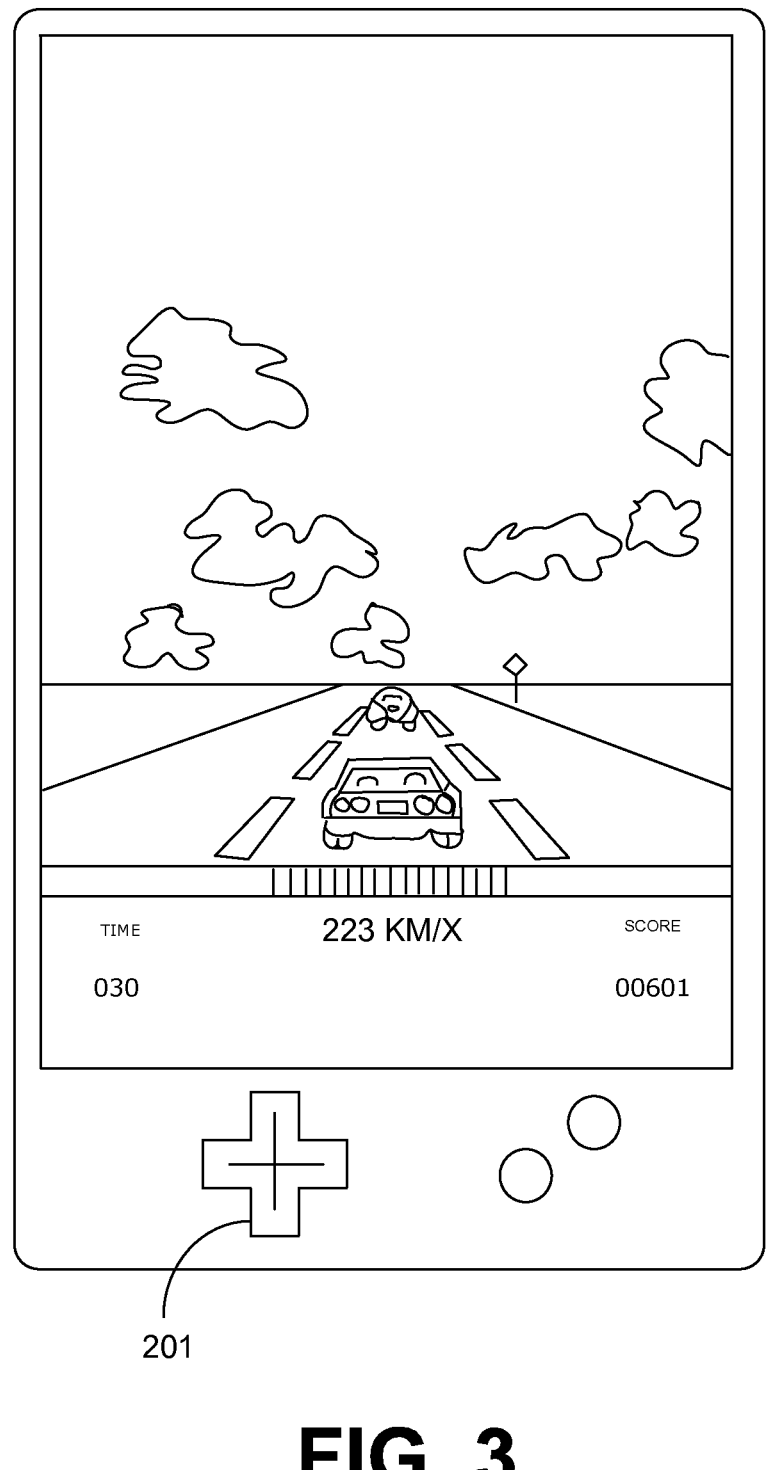
FIG. 3 is a drawing of an example of a user interface rendered by a device in the networked environment of FIG. 1 according to various embodiments of the present disclosure.

Continuing the example of FIG. 2, reference is now made to FIG. 3, which another example of a client 106*d* executing an application binary 133 provided by the application distribution service 118 that is tailored for the capabilities of the client 106*d* shown in FIG. 3. In this non-limiting example, the client 106*d* has varying capabilities relative to the client 106*c* shown in FIG. 2. In the example of FIG. 3, the client 106*d* is equipped with an input device 201 that the client 106 shown in FIG. 2 does not include. Accordingly, the client application 163 executed by the device and through which the application binary 133 is fulfilled can report the presence of the input device 201, and the application distribution service 118 can determine from the device compatibility data 137 a compatible version of the application 127 that should be fulfilled to the device when it determines whether the user account 129 with which the device is registered is entitled to the application 127.

In the depicted scenario of FIG. 3, the selected application binary 133 corresponding to the application 127 is created such that it takes advantage of the additional input device capabilities of the client 106*d*, which is functionality that may not be present in the application binary 133 fulfilled to the client 106*c* depicted in FIG. 2. In some embodiments, the application binary 133 fulfilled to the client 106*d* may be configured for a different operating system or tailored to other hardware and software features of the client 106*d* that may vary from the client 106*c* of FIG. 2.

It should also be appreciated that in some scenarios, the application distribution service 118 may be unable to identify an application binary 133 that is compatible with a particular client 106 that is registered with a user account 129. Accordingly, in such a scenario, the application distribution service 118 may entitle the user account 129 as well as a particular client 106 to access to a browser compatible application 135 that is associated with the application 127.

Figure 4:
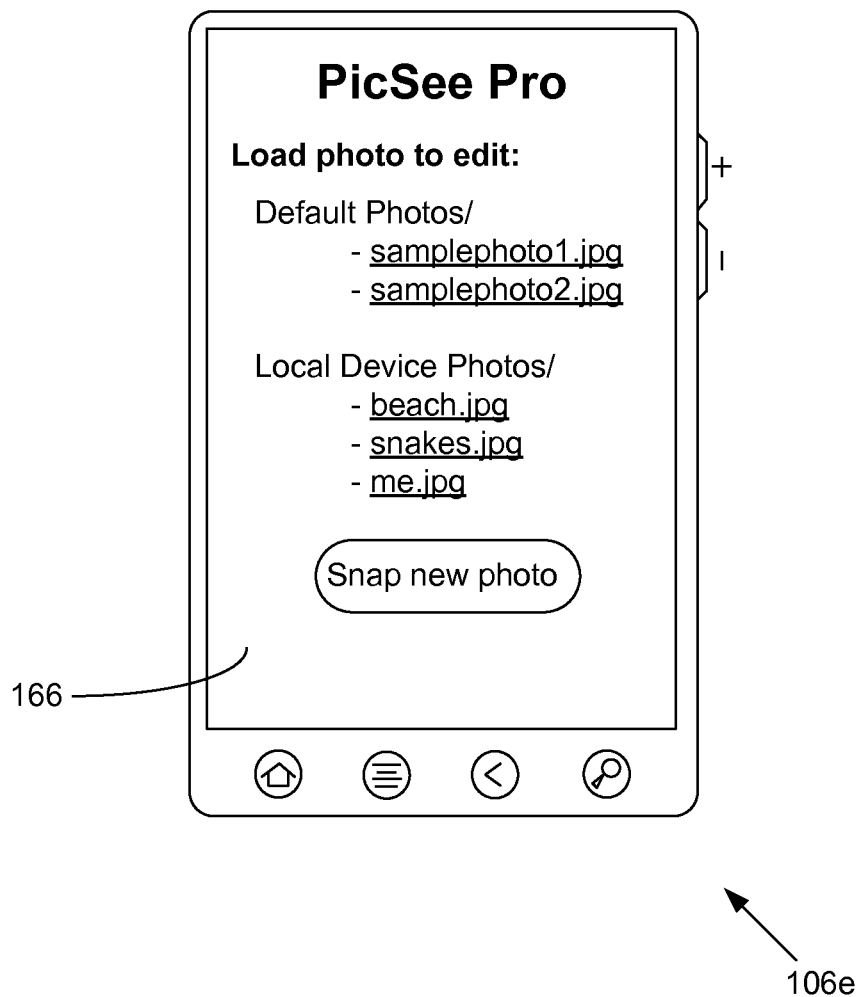
FIG. 4 is a drawing of an example of a user interface rendered by a device in the networked environment of FIG. 1 according to various embodiments of the present disclosure.

Reference is now made to FIG. 4, which illustrates an alternative example of a client 106*e* in the networked environment 100 (FIG. 1). In this non-limiting example, the client 106*e* corresponds to a smartphone that is configured with a rear facing camera but that is also configured without a front-facing camera. The screen 166 of the client 106*e* shows a user interface generated by an application binary 133 (FIG. 1) executed by the client 106*e*. In the depicted example, the client 106*e* is registered with a user account 129, and the application distribution service 118 facilitates fulfillment of an application binary 133 that is compatible with the capabilities of the client 106*e*.

Accordingly, the client application 163 executed by the client 106*e* and through which the application binary 133 is fulfilled via the application distribution service 118 can report the presence of a rear facing camera and the lack of a front facing camera, and the application distribution service 118 can determine from the device compatibility data 137 a compatible version of an application binary 133 corresponding to the application 127 that should be fulfilled to the device. The application distribution service 118 can initiate fulfillment of the appropriate application binary 133 when it determines whether the user account 129 with which the device is registered is entitled to the application 127.

Figure 5:
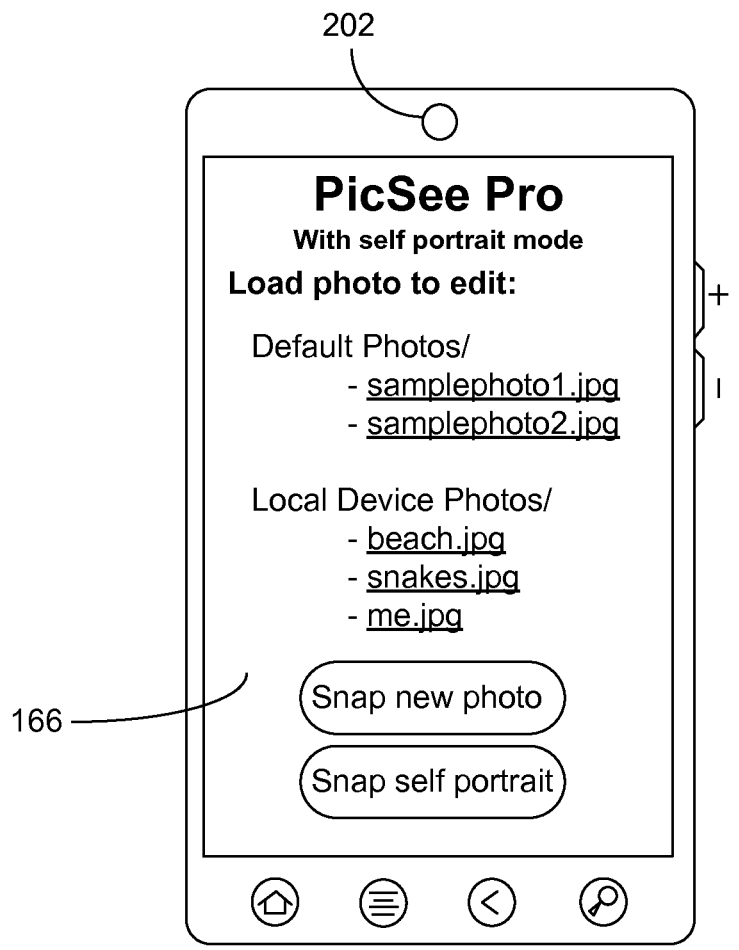
FIG. 5 is a drawing of an example of a user interface rendered by a device in the networked environment of FIG. 1 according to various embodiments of the present disclosure.

Continuing the example of FIG. 4, reference is now made to FIG. 5. In this non-limiting example, the client 106*f* corresponds to a smartphone that is configured with a rear facing camera as well as a front-facing camera 202. The screen 166 of the client 106*f* shows a user interface generated by an application binary 133 (FIG. 1) executed by the client 106f. In the depicted example, the client 106f is registered with a user account 129, and the application distribution service 118 facilitates fulfillment of an application binary 133 that is compatible with the capabilities of the client 106f. In the scenario of FIGS. 4 and 5, an application 127 may be associated with application binaries 133 that differ in their configuration depending upon the presence of a front facing camera in a client 106 in which the application binary 133 is executed.

Accordingly, the client application 163 executed by the client 106f and through which the application binary 133 is fulfilled via the application distribution service 118 can report the presence of a rear facing camera and a front facing camera, and the application distribution service 118 can determine from the device compatibility data 137 a compatible version of an application binary 133 corresponding to the application 127 that is tailored to the presence of a front facing camera. As shown in the example of FIG. 5, the capabilities of the application binary 133 can vary depending upon the varying hardware and/or software capabilities of the client 106f relative to the example shown in FIG. 4

Figure 6:
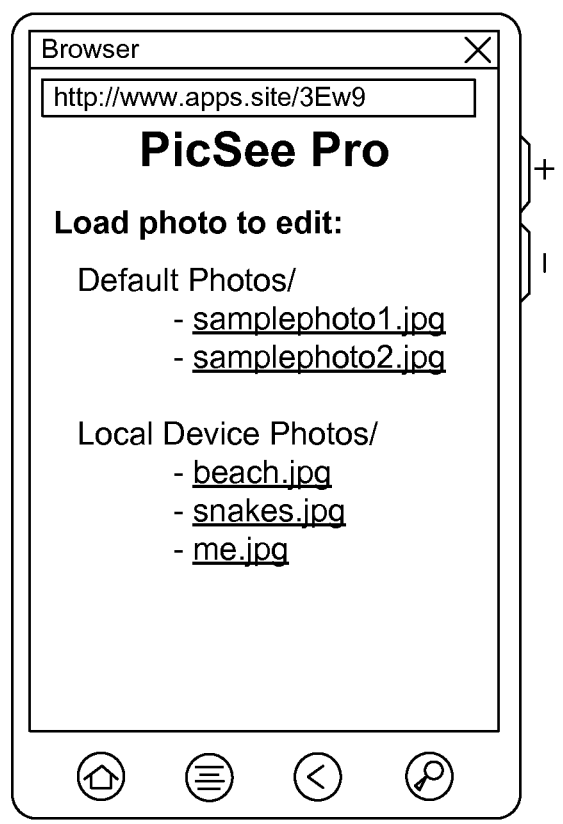
FIG. 6 is a drawing of an example of a user interface rendered by a device in the networked environment of FIG. 1 according to various embodiments of the present disclosure.

Continuing the example of FIGS. 4-5, reference is now made to FIG. 6. In this non-limiting example, the client 106g corresponds to a smartphone that is accessing a browser accessible application 135 corresponding to a particular application. As shown in the example of FIG. 6, the browser accessible application 135 may be tailored to the capabilities of a device that are accessible via a browser. It should also be appreciated that embodiments of the disclosure can also facilitate fulfillment of an appropriate compatible version of an application to any type of client device that a user may register with a user account 129. For example, other types of clients can include a set-top box, gaming console, television, or any other type of device that a user may associated with a user account 129 and access content provided by the application distribution service 118.

Figure 7:
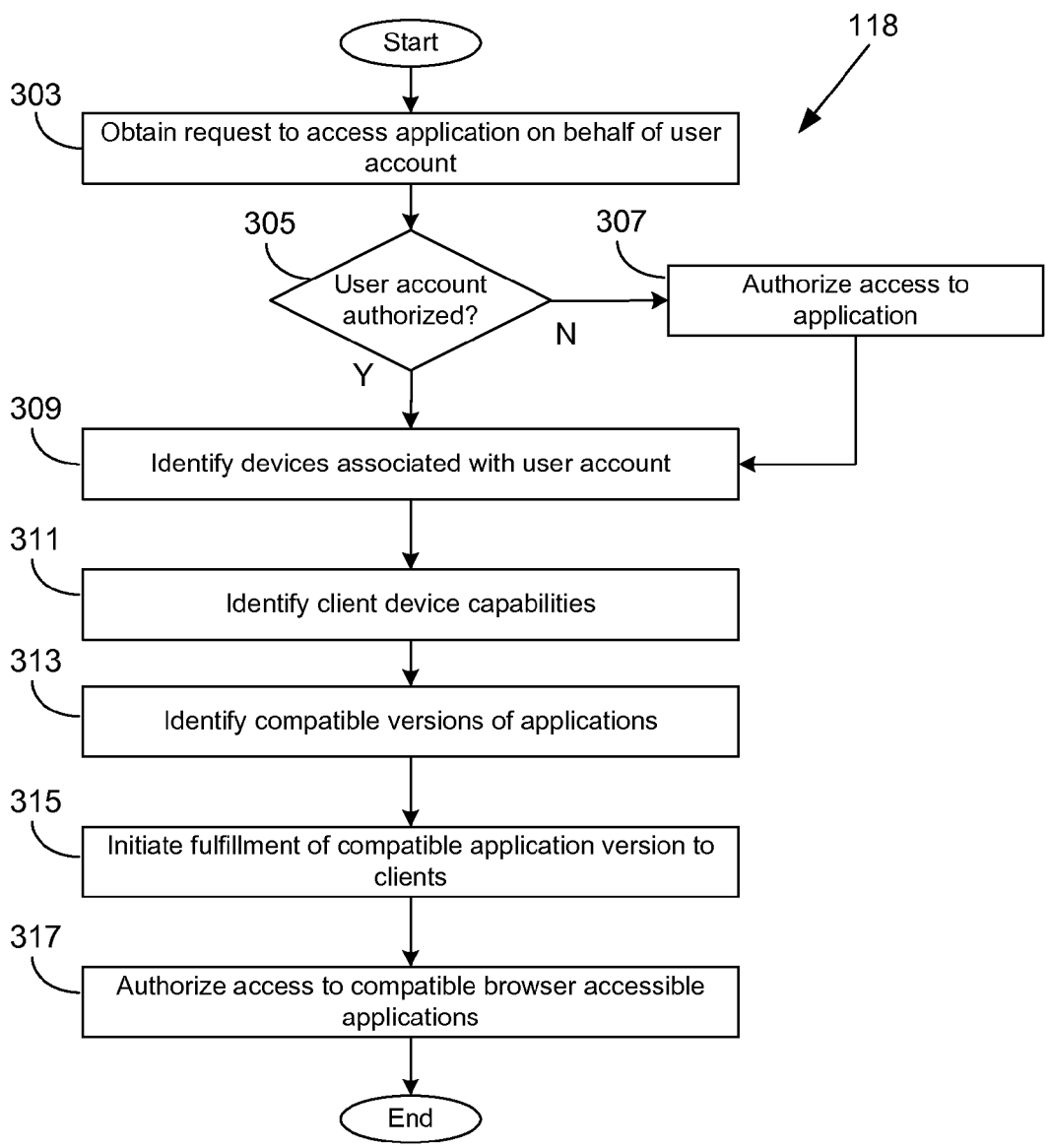
FIG. 7 is a flowchart illustrating one example of functionality implemented as portions of the application distribution service executed in a computing environment in the networked environment of FIG. 1 according to various embodiments of the present disclosure.

Moving on to FIG. 7, shown is a flowchart that provides one example of the operation of a portion of the application distribution service 118 according to various embodiments. It is understood that the flowchart of FIG. 7 provides merely an example of the many different types of functional arrangements that may be employed to implement the operation of the portion of the application distribution service 118 as described herein. As an alternative, the flowchart of FIG. 7 may be viewed as depicting an example of steps of a method implemented in the computing environment 103 (FIG. 1) according to one or more embodiments Beginning with box 303, the application distribution service 118 obtains a request on behalf of a user account 129 to access an application 127. In box 305, the application distribution service 118 can determine whether the user account 129 is authorized to access the application 127. If the user account 129 is not authorized to access the application, the application distribution service 118 can authorize such access in box 307. Such authorization can comprise a purchase of an application 127 via the electronic commerce system 124 or any other method of granting access to the application 127 on behalf of a user account 129.

In box 309, the application distribution service 118 can identify one or more devices that are associated with the user account 129. As noted above, each user account 129 can be associated with various devices of varying hardware and/or software capabilities. Accordingly, in box 311, the application distribution service 118 can identify the device capabilities of the various devices associated with the user account 129. For example, the application distribution service 118 can determine from device data 143 associated with the user account 129 the operating system executed by each of the devices as well as other hardware and software capabilities of the devices.

In box 313, the application distribution service 118 can then determine from device compatibility data 137 associated with the application 127 which application binaries 133 of the application 127 are appropriate for each of the devices based upon the detected device capabilities. As noted above, the device compatibility data 137 can specify that certain application binaries 133 and/or browser accessible applications 135 are intended for devices having certain capabilities and/or or features. Accordingly, in box 315, the application distribution service 118 can initiate fulfillment of the appropriate application binaries 133 to the various devices associated with the user account 129. In one example, the application distribution service 118 can transmit the appropriate application binaries 133 to a client application 163 executed on the respective devices, which can facilitate installation and/or execution of the application binaries 133 on the devices. Additionally, in some examples, the application distribution service 118 can also initiate fulfillment of an appropriate browser accessible application 135 to an appropriate client associated with the user. Additionally, the application distribution service 118 can also initiate fulfillment of the application by granting access to the clients 106 to an appropriate browser accessible application 135 associated with the application 127 in box 317.

The client application 163 and/or application binary 133 can also report application performance metrics that can be obtained by the application distribution service 118 and associated with the specific application binary 133 provided by the application distributions service 118 to a particular client 106. For example, the application binary 133 and/or client application 163 can be configured to track various metrics, such as, but not limited to, processor utilization, video framerate data, application failures and/or crash data, or any other performance metrics or data. In this way, the application distribution service 118 can track the performance of a particular application binary 133 and provide reporting data that can be used to improve the device compatibility data associated with a particular application 127.

Figure 8:
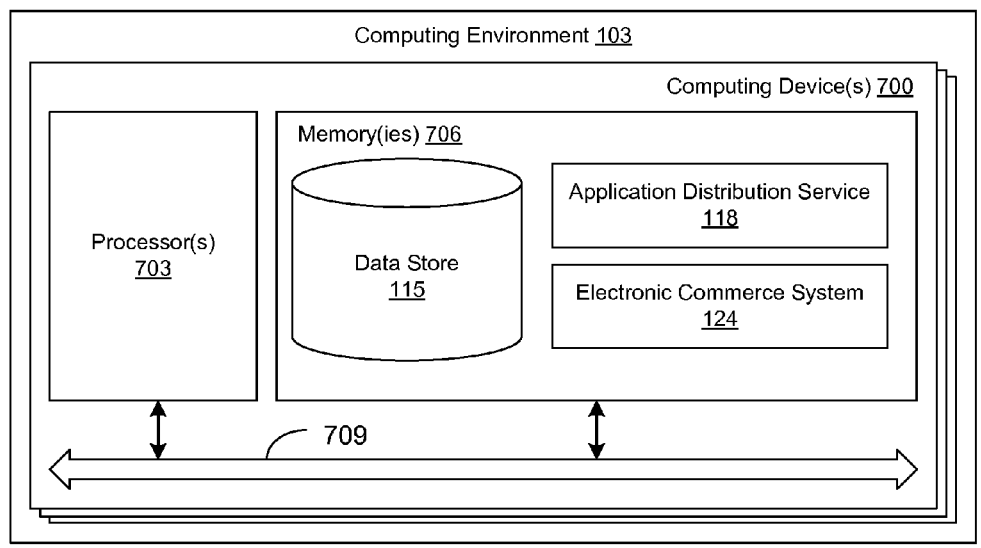
FIG. 8 is a schematic block diagram that provides one example illustration of a computing environment employed in the networked environment of FIG. 1 according to various embodiments of the present disclosure.

With reference to FIG. 8, shown is a schematic block diagram of the computing environment 103 according to an embodiment of the present disclosure. The computing environment 103 includes one or more computing devices 700. The computing device 700 includes at least one processor circuit, for example, having a processor 703 and a memory 706, both of which are coupled to a local interface 709. To this end, the computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 is the payment tracking application 118 and potentially other applications. Also stored in the memory 706 may be a data store 115 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the application distribution service 118, the electronic commerce system 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 7 shows the functionality and operation of an implementation of portions of the application distribution service 118 and the electronic commerce system 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowchart of FIG. 7 shows a specific order of execution, it is understood that the order of execution may differ from that which is depicted. For example, the order of execution of two or more blocks may be scrambled relative to the order shown. Also, two or more blocks shown in succession in FIG. 7 may be executed concurrently or with partial concurrence. Further, in some embodiments, one or more of the blocks shown in FIG. 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including application distribution service 118 and the electronic commerce system 124, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, comprising:
   code that obtains a request to access an application on behalf of a user account, the request obtained from a client device;
   code that determines whether the client device is registered with the user account;
   code that registers the client device with the user account when the client device is not registered with the user account;
   code that determines whether the user account is authorized to access the application;
   code that authorizes the user account to access the application;
   code that identifies a device characteristic associated with the client device;
   code that identifies an application binary corresponding to the application that is associated with the device characteristic;
   code that transmits the application binary to the client device; and
   code that entitles the client device to access a browser accessible version of the application corresponding to a browser capability of the client device, the browser accessible version of the application being selected based at least in part upon the device characteristic.

2. The non-transitory computer-readable medium of claim 1, wherein the program further comprises code that initiates fulfillment of a respective compatible application binary corresponding to the application to a plurality of client devices associated with the user account.

3. A system, comprising:
   at least one computing device; and
   an application distribution service executable in the at least one computing device, the application distribution service comprising:
      logic that obtains a request to access an application on behalf of at least one client;
      logic that identifies at least one characteristic corresponding to the at least one client;
      logic that identifies a first respective compatible version of the application, the first respective compatible version comprising a binary application corresponding to the application that is associated with the at least one characteristic;
      logic that identifies a second respective compatible version of the application, the second respective compatible version of the application comprising a browser accessible version of the application corresponding to a browser capability of the at least one client, the browser accessible version of the application being selected based at least in part upon the at least one characteristic; and
      logic that initiates fulfillment of the first respective compatible version or the second respective compatible version to the at least one client.

4. The system of claim 3, wherein the application distribution service further comprises:
   logic that obtains a request to register the at least one client with a user account;
   logic that generates a device identifier corresponding to the at least one client; and
   logic that associates the at least one client with the user account.

5. The system of claim 4, wherein the application distribution service further comprises logic that discovers a device characteristic associated with the at least one client.

6. The system of claim 5, wherein the logic that discovers the device characteristic further comprises logic that obtains the device characteristic from the application executed by the at least one client.

7. The system of claim 6, wherein the application executed by the at least one client is at least one of: a browser or a client application configured to communicate with a content delivery application.

8. The system of claim 3, wherein the logic that initiates fulfillment further comprises:
   logic that identifies a user account associated with the at least one client;
   logic that identifies a product identifier corresponding to the binary application; and
   logic that associates the user account with the product identifier.

9. The system of claim 3, wherein the logic that initiates fulfillment further comprises:
   logic that grants access to the browser accessible version of the application to a user account.

10. The system of claim 3, wherein the logic that initiates fulfillment of the first respective compatible version or the second respective compatible version further comprises logic that transmits the first respective compatible version or the second respective compatible version to the at least one client.

11. The system of claim 3, wherein the at least one characteristic comprises at least one of a language or a region associated with the at least one client.

12. The system of claim 3, wherein the at least one characteristic comprises a characteristic associated with a hardware feature of the at least one client.

13. The system of claim 12, wherein the hardware feature comprises at least one of: a camera characteristic, a display resolution, a microphone characteristic, a processor speed, a processor identity, a speaker characteristic, or a presence of a global navigation satellite system chipset.

14. The system of claim 3, wherein the at least one characteristic comprises at least one of an identity or a version of at least one of an operating system or a browser executed by the at least one client.

15. The system of claim 14, wherein the binary application that is executable within the operating system.

16. A method, comprising:
   receiving, in at least one computing device, a request to access an application on behalf of a user account;
   identifying, in the at least one computing device, a plurality of devices associated with the user account;
   identifying, in the at least one computing device, at least one device characteristic corresponding to one of the plurality of devices;
   identifying, in the at least one computing device, a first compatible version of the application that corresponds to the one of the plurality of devices, the first compatible version of the application comprising a binary application corresponding to the application;
   identifying, in the at least one computing device, a second compatible version of the application that corresponds to the one of the plurality of devices, the second compatible version of the application comprising a browser accessible version of the application, the browser accessible version of the application being selected based at least in part upon the at least one device characteristic; and initiating, in the at least one computing device, fulfillment of the first compatible version of the application or the second compatible version of the application to the one of the plurality of devices.

17. The method of claim 16, wherein initiating fulfillment to the one of the plurality of devices further comprises transmitting the first compatible version of the application or the second compatible version of the application to a client application executed by the one of the plurality of devices.

18. The method of claim 16, wherein initiating fulfillment to the one of the plurality of devices further comprises entitling the user account to access the browser accessible version of the application.

19. The method of claim 16, wherein identifying the second compatible version of the application is based at least in part upon device compatibility data associated with the application.

20. The method of claim 19, wherein the device compatibility data comprises the at least one device characteristic associated with the one of the plurality of devices, the at least one device characteristic comprising a respective operating system executed by the plurality of devices, a camera characteristic, a display resolution, a microphone characteristic, a processor speed, a processor identity, a speaker characteristic, or a presence of a global navigation satellite system chipset.

21. The method of claim 16, wherein identifying the plurality of devices associated with the user account is based at least in part upon a plurality of registered devices associated with the user account, the plurality of registered devices being registered by a respective client application executed in individual ones of the plurality of registered devices.

22. The non-transitory computer-readable medium of claim 1, wherein the browser accessible version of the application is accessible via a browser executed on the client device, the browser being associated with the browser capability of the client device.

* * * * *